United States Patent
Tamura (10) Patent No.: US 6,598,931 B2
(45) Date of Patent: Jul. 29, 2003

(54) CONDUCTIVE WIRES PROTECTION CASE CONSTRUCTION ON REAR GLASS IN CONVERTIBLE TOP

(75) Inventor: Michio Tamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/179,848

(22) Filed: Jun. 26, 2002

(65) Prior Publication Data

US 2003/0006626 A1 Jan. 9, 2003

(30) Foreign Application Priority Data

Jul. 3, 2001 (JP) ........................................ 2001-201900

(51) Int. Cl.[7] .................................................. B60J 1/18
(52) U.S. Cl. ..................... 296/146.14; 219/203; 439/34
(58) Field of Search ........................ 296/146.14, 107.07, 296/201, 147, 223; 219/203; 439/34, 352

(56) References Cited

U.S. PATENT DOCUMENTS

| | | | | |
|---|---|---|---|---|
| 4,023,008 A | * | 5/1977 | Durussel ..................... | 219/203 |
| 4,453,669 A | * | 6/1984 | Karla et al. ................. | 219/203 |
| 4,611,849 A | * | 9/1986 | Trenkler ................. | 296/146.14 |
| 4,707,591 A | * | 11/1987 | Sprenger ..................... | 219/203 |
| 4,767,337 A | * | 8/1988 | Kawasaki et al. ............. | 439/34 |
| 4,954,797 A | * | 9/1990 | Shinnai et al. ............... | 219/203 |
| 5,021,003 A | * | 6/1991 | Ohtaka et al. ............... | 439/357 |
| 5,208,444 A | * | 5/1993 | Winter et al. ................. | 219/203 |
| 5,293,174 A | * | 3/1994 | Kropielnicki et al. ........ | 343/713 |
| 5,295,868 A | * | 3/1994 | Viaud et al. ................. | 439/610 |
| 5,414,240 A | * | 5/1995 | Carter et al. ................. | 219/203 |
| 5,466,911 A | * | 11/1995 | Spagnoli et al. ............. | 219/203 |
| 5,543,601 A | * | 8/1996 | Bartrug et al. .............. | 219/203 |
| 5,676,562 A | * | 10/1997 | Fukuda ........................ | 439/357 |
| 6,014,840 A | * | 1/2000 | Ray et al. ...................... | 49/413 |
| 6,255,624 B1 | * | 7/2001 | Boaz et al. .................. | 219/203 |
| 6,320,159 B1 | * | 11/2001 | Topp ........................... | 219/203 |
| 6,422,889 B2 | * | 7/2002 | Hayashi ........................ | 439/34 |
| 6,455,809 B1 | * | 9/2002 | Kuno et al. .................. | 219/203 |
| 6,492,619 B1 | * | 12/2002 | Sol ................................ | 219/203 |
| 2002/0049002 A1 | * | 4/2002 | Higashida et al. ........... | 439/677 |
| 2002/0166852 A1 | * | 11/2002 | Kim ............................ | 219/203 |

FOREIGN PATENT DOCUMENTS

| | | | |
|---|---|---|---|
| DE | 3604437 | * | 8/1987 |
| GB | 2 034 160 | * | 5/1980 |
| JP | 6-156086 | | 6/1994 |
| JP | 10-24782 | | 1/1998 |
| JP | 10-236240 | | 9/1998 |

* cited by examiner

*Primary Examiner*—Kiran Patel
(74) *Attorney, Agent, or Firm*—Sughrue Mion, PLLC

(57) ABSTRACT

A harness protection case (13) whose overall height (H) from a surface of a rear glass (5) becomes higher than a connector (11) is provided adjacent to the connector (11) on the surface of the rear glass (5), the harness protection case (13) being provided with a holding portion (40) for bundling a plurality of harnesses together.

3 Claims, 7 Drawing Sheets

CONDUCTIVE WIRES PROTECTION CASE CONSTRUCTION ON REAR GLASS IN CONVERTIBLE TOP

BACKGROUND OF THE INVENTION

1. Field of the Invention

The present invention relates to a conductive wires protection case construction on a rear glass in a convertible top.

2. Description of the Related Art

Conventionally, a convertible top vehicle has been known which is constructed such that a roof portion of a vehicle body can be opened to enhance the sense of openness felt by the driver and passengers. To be specific, a soft top is constructed to be freely folded, whereby the roof portion is closed by deploying the soft top where as the roof portion is opened by folding the soft top to the rear of the rear passenger seat.

Incidentally, in the convertible top vehicle, there has been proposed a construction in which a rear glass is incorporated in the soft top (for example, refer to JP-A-6-156086). The incorporation of the rear glass in the soft top can ensure the sufficient vision to the rear.

In general, while there are many cases where electric components such as hot wires, a wiper and a high mounted stop lamp are mounted on a rear glass of a vehicle, in order to feed the electric components so mounted with power, as shown in, for example, JP-A10-24782, there has been proposed a construction in which connectors for connecting the electric components and harnesses for feeding the electric components are provided on the rear glass in such a manner as to be exposed to the outside.

In addition, there has also been proposed a construction in which the harnesses for the electric components are wired on an interior surface of the rear glass along the circumference thereof using exterior members (refer to JP-A-10-236240).

However, in the construction in which the connectors are provided on the rear glass in such a manner as to be exposed to the outside, there occurs a problem that a countermeasures against water leakage is inevitable. On the contrary, in the construction in which the harnesses are wired on the interior surface of the rear glass along the circumference thereof, the exterior members are provided along the full length of the path along which the harnesses are wired, there is triggered a problem that the weight of the rear glass is increased.

Incidentally, in a case where the electric components are mounted on the rear glass in the convertible soft top, there is also contemplated a construction in which harnesses are wired in an exposed fashion on the interior surface of the rear glass which requires no countermeasures against water leakage using connectors or the like for the electric components instead of the exterior members, which would eliminate a risk of increasing the weight of the rear glass. However, in stowing the soft top, when the rear glass is received on an interior member such as a rear tray which is disposed to the rear of a seat in the body of the vehicle before the soft top has been completely stowed the connectors may be brought into collision with an upper face of the rear tray, leading to a cause for the failure of the electric components. To cope with this, a certain limit needs to be imposed to the soft top stowing position so that a certain space can be insured between the rear glass and the rear tray, whereby the connectors are prevented from being brought into collision with the rear tray when stowing the soft top.

However, where the certain space is insured between the rear glass and the rear tray as described above, the stopping position of the entirety of the soft top when stowed needs to be raised by an extent equal to the space, which results in a problem that the quality in terms of the external appearance when the soft top is stowed is deteriorated or the vision to the rear cannot be insured sufficiently.

In addition, in the event that the positioning of the harnesses is not implemented positively, the positions of the harnesses would be largely changed when they are moved, for example, at the time of cleaning the interior of the vehicle. As a result, an interference with the rear tray is triggered, leading to a risk that the harnesses are damaged by virtue of friction between the rear tray and themselves that would be generated by vibrations while the vehicle is running.

SUMMARY OF THE INVENTION

To cope with this, the invention provides a conductive wires protection case construction on a rear glass in a convertible soft top which can enhance the quality in external appearance and eliminate damages to the harnesses.

With a view to solving the problems, according to a first aspect of the invention, there is provided a conductive wires protection case construction on a rear glass in a convertible top wherein a harness protection case (for example, a harness protection case 13 in an embodiment) having an overall height (for example, an overall height H in the embodiment) which is higher than a connector (for example, a connector 11 in the embodiment) is provided on a surface of the rear glass (for example, a passenger compartment-side interior surface of a rear glass 5 in the embodiment) at a position adjacent to the connector, the harness protection case being provided with a holding portion (for example, a holding portion 40 in the embodiment) for bundling up a plurality of harnesses (for example, harnesses 9 in the embodiment).

By constructing the protection case construction as described above, when the rear glass is stowed the harness protection case whose overall height is higher than the connector is brought into abutment with the interior member in the vehicle body, whereby the contact of the connectors with the interior member in the vehicle body can be prevented. In addition, since the rear glass can be stowed at a position as low as possible until the harness protection case comes into abutment with the interior member in the vehicle body, the stowing position of the entirety of the soft top can be kept lower by that extent. Then, the harness protection case can bundle up the harnesses with the holding portion thereof, whereby the interference of the harnesses with peripheral members can be prevented.

DETAILED DESCRIPTION OF THE PREFERRED EMBODIMENTS

An embodiment of the invention will be described below in conjunction with the accompanying drawings.

Figure 1:
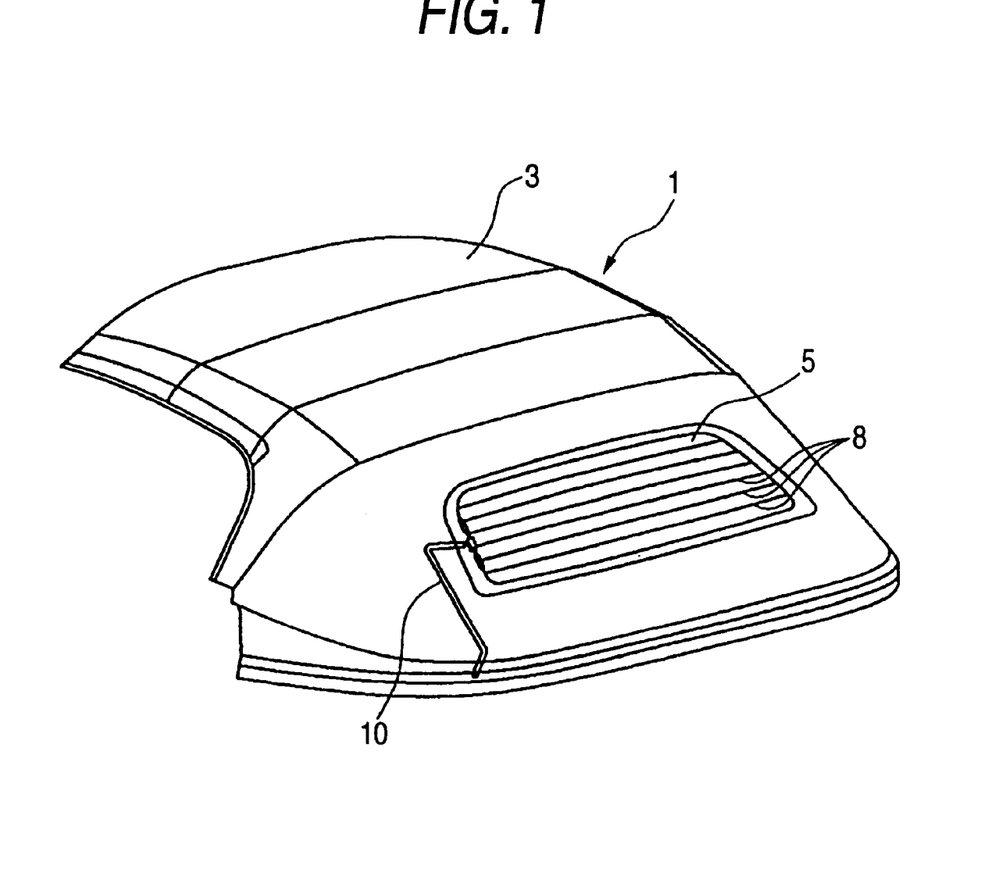
FIG. 1 is a perspective view showing a closed condition of a roof according to an embodiment of the invention.

FIG. 1 is a perspective view showing a closed condition of a roof (a convertible top) according to an embodiment of the invention.

Figure 2:
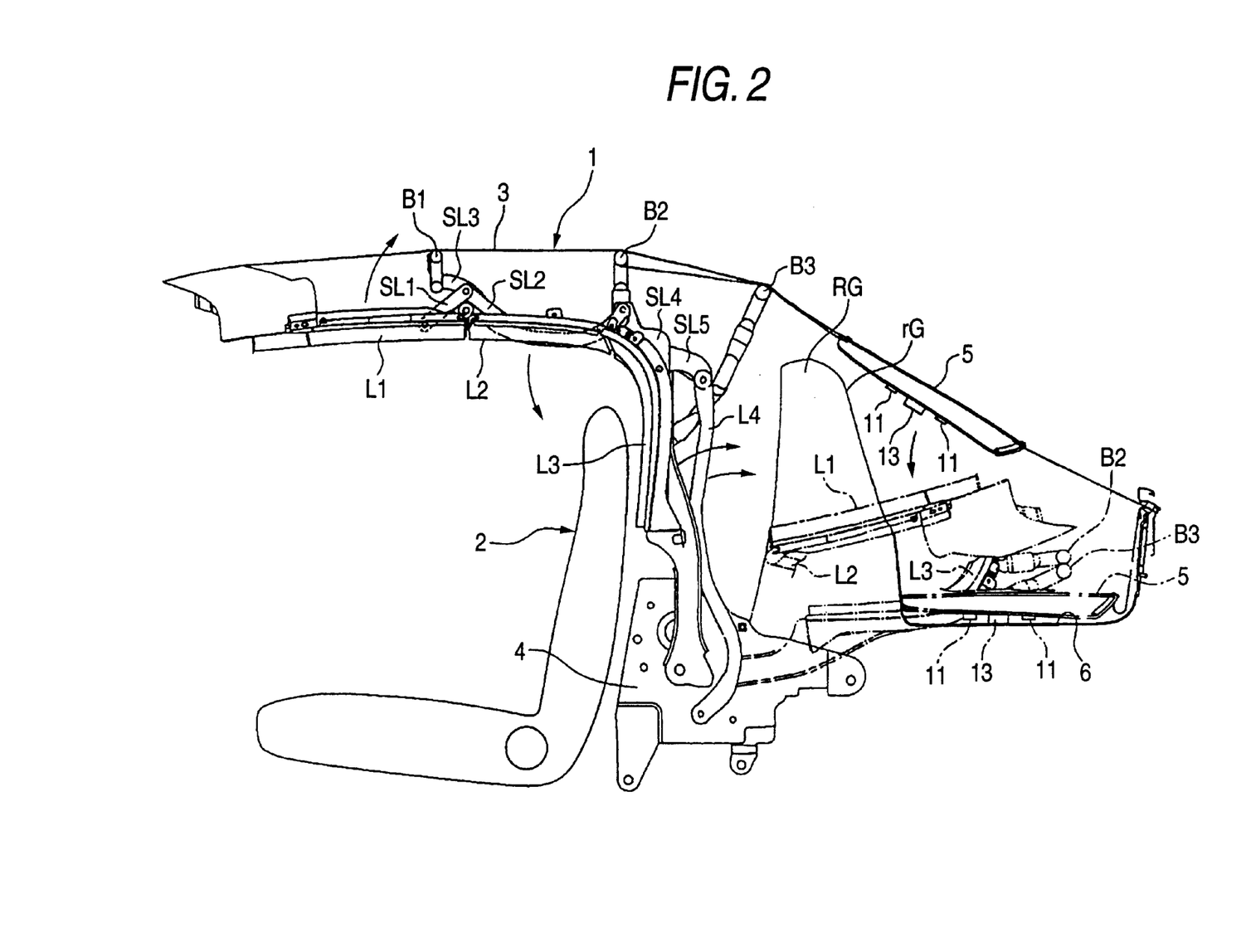
FIG. 2 is an explanatory side view showing the closed condition and an open condition of the roof according to the embodiment of the invention.

The roof 1 is constructed to be mounted to a vehicle body at a lower portion thereof and to be detachably locked onto a front roof rail (not shown) at an upper portion thereof. This roof 1 can close an upper opening of the body and open the upper opening of the body when unlocked from the front rail to be folded down to the rear of a seat. FIG. 2 is an explanatory side view showing both a roof closed condition (shown by solid lines) and a roof opened condition (shown by chain lines).

As shown in FIG. 2, the roof 1 comprises a plurality of links L1, L2 . . . and a soft top 3 and is constructed so as to be freely folded down. The two front-side links L1, L2 which constitute a side door opening and the main link L3 which corresponds to a door side portion are connected to each other via a plurality of sub-links SL1, SL2, SL3, SL4, SL5 . . . and a proximal portion of the main link L3 and a proximal portion of an auxiliary link L4 disposed along the main link L3 are rotatably supported on a bracket 4 fixed to the body. Then, when the main link L3 and the auxiliary link L4 rotate rearward the respective links rotate in turn in directions indicated by arrows, whereby the soft top 3 is stowed at a rear portion to a seat 2. Note that the soft top 3 is expanded by means of a front bow B1 supported on the sub-link SL3, a mid bow B2 supported on the sub-link SL4 and a rear bow B3 supported on the main link L3 in the roof closed condition.

Here, a rear glass 5 is provided in a rear side of the roof 1 in such a manner as to be supported in the soft top 3. The rear glass 5 is constructed to be lowered downwardly in a state in which a passenger compartment-side interior side thereof is oriented downwardly while being guided by a roll bar of the seat 2 and an inclined rear face rG of a roll bar garnish RG when the roof 1 is folded down, so that the rear glass 5 rests on an upper face of a rear tray 6, which is an interior member provided to the rear of the seat 2 in the body of the vehicle. As shown in FIG. 1, the rear glass 5 is provided with hot wires 8 for defogging the rear glass 5 to ensure the vision to the rear, and a plurality of hot wires 8 are disposed at upper and lower portions on the rear glass 5, respectively, in this embodiment.

Figure 3:
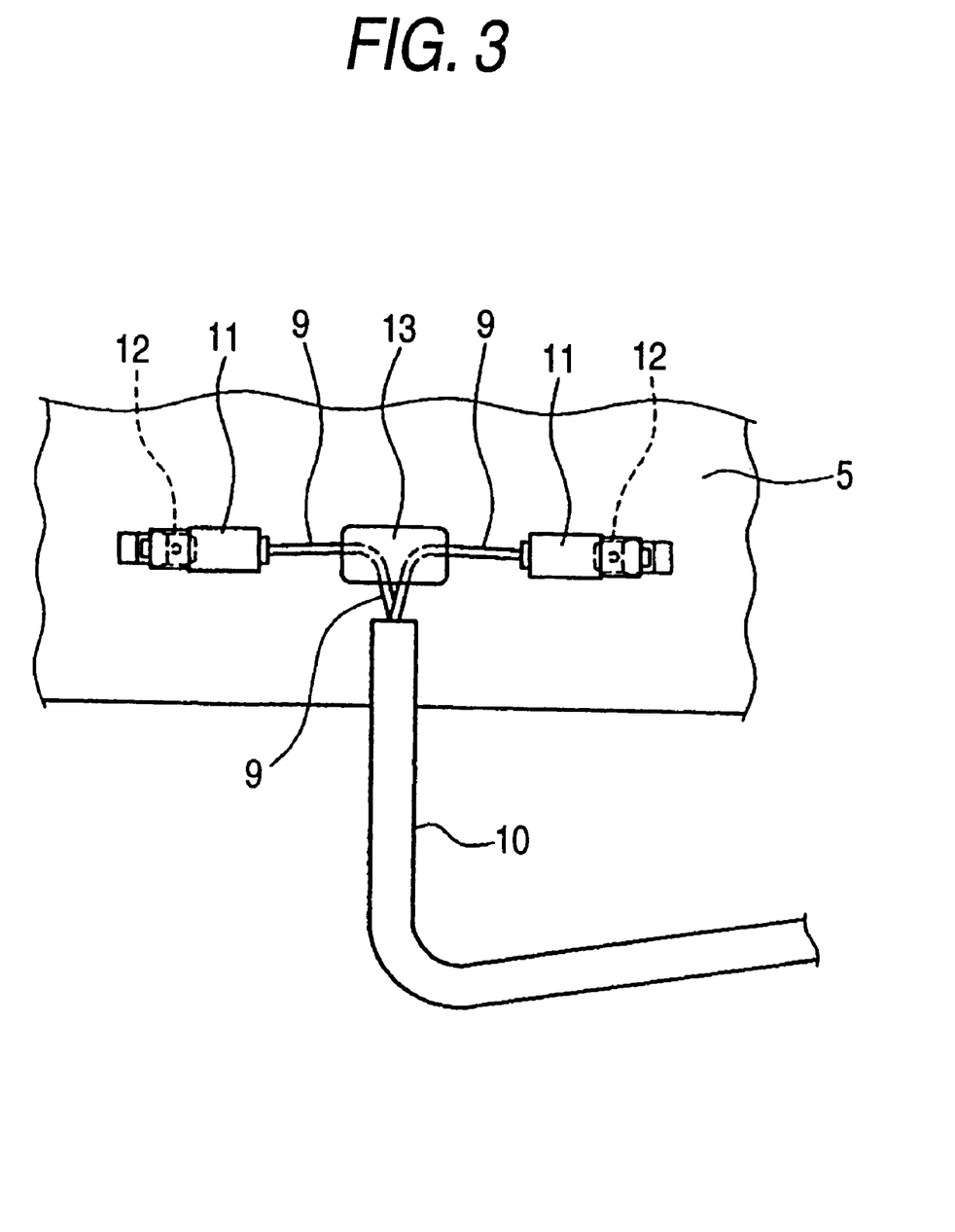
FIG. 3 is a view showing a state in which harnesses are wired on a back side of a rear glass according to the embodiment of the invention.

Then, as shown in FIG. 3, harnesses 9 for feeding the hot wires 8 are drawn out of a tube 10 to be divided into two, and the harnesses 9 so divided are then connected to connectors 11 by way of a harness protection case 13. Then, the connectors 11 are connected to the corresponding hot wires 8 by being connected to associated terminals 12. Consequently, in other words, the respective harnesses 9 corresponding to the hot wires 8 are wired via the connectors 11 and are bundled together at the harness protection case 13.

Figure 4:
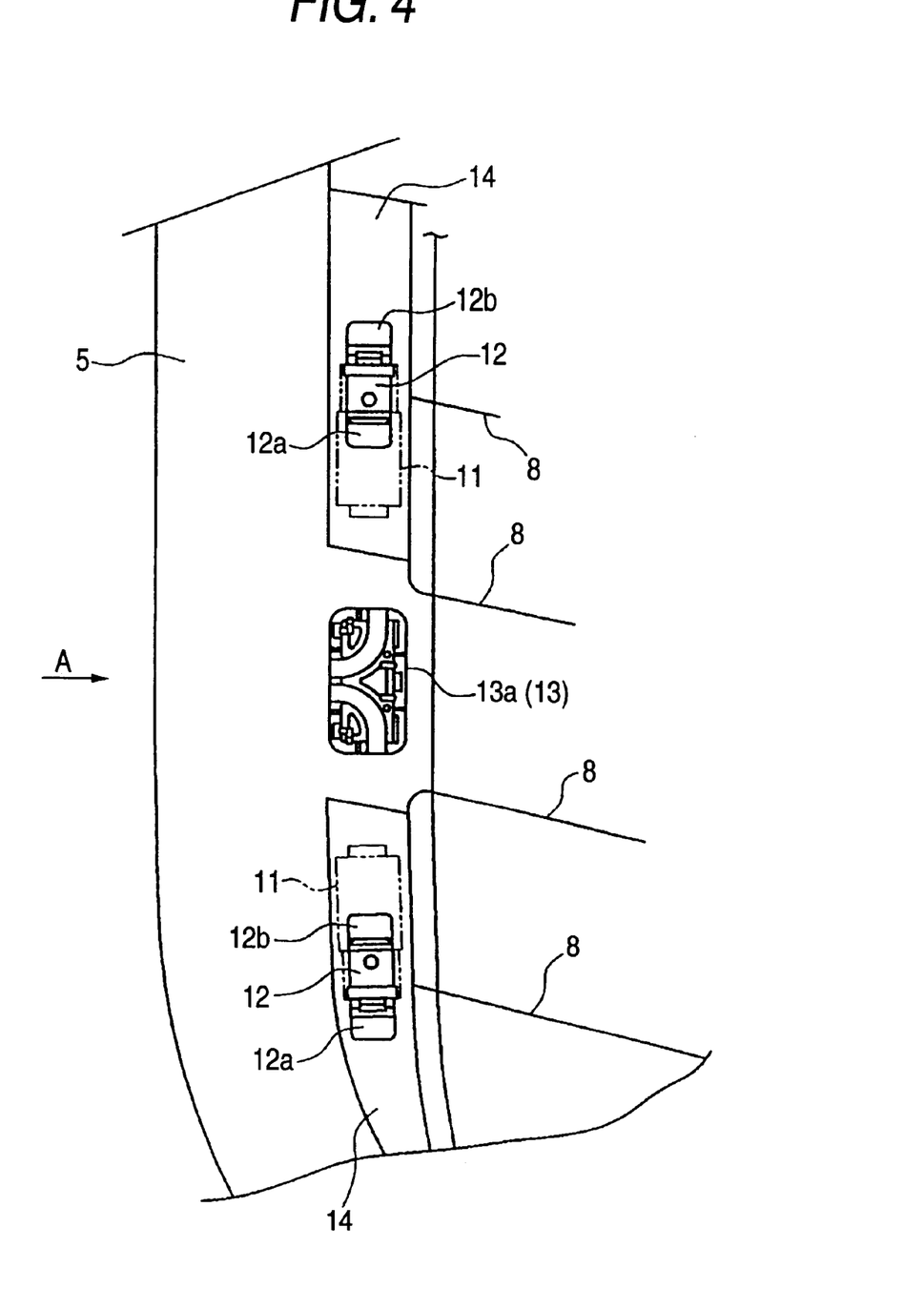
FIG. 4 is a view as seen from the back side of the rear glass according to the embodiment of the invention.
Figure 5:
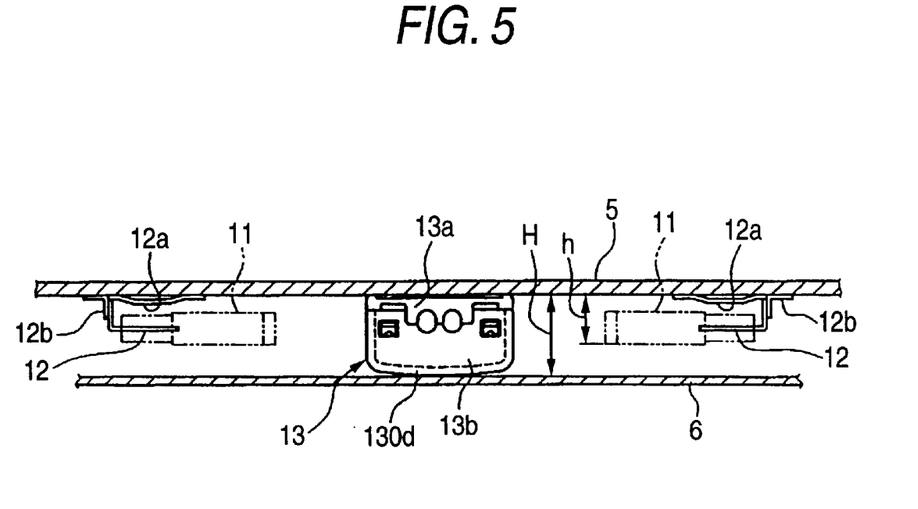
FIG. 5 is a view as seen from a direction indicated by an arrow A in FIG. 4.

As shown in FIGS. 4, 5, the harness protection case 13 is fixed to the rear glass 5 with an adhesive such as a urethane at a position situated between the two connectors 11 and adjacent to the respective connectors 11. On the other hand, the connectors 11 are constructed to be attached to end portions of the harnesses 9, respectively. A base portion 12a of the U-shaped terminal 12 is soldered to a hot wire land portion 14 on the surface of the rear glass 5 in a state in which the terminal 12 is supported by an L-shaped bracket 12b, and the connector 11 attached to the end portion of each harness 9 is constructed to be inserted in this terminal 12.

Here, as shown in FIG. 5, the harness protection case 13 is formed such that the overall height H of the harness protection case relative to the surface of the rear glass 5 or from the passenger compartment-side interior surface of the rear glass 5 becomes larger than the overall height h of the connector 11, so that an upper wall 130d of the harness protection case 13 is brought into abutment with the rear tray 6 to exhibit a spacer function when the rear glass 5 is stowed at the time of opening the roof 1, whereby the direct collision of the connector 11 against the rear tray 6 is prevented.

Figure 6:
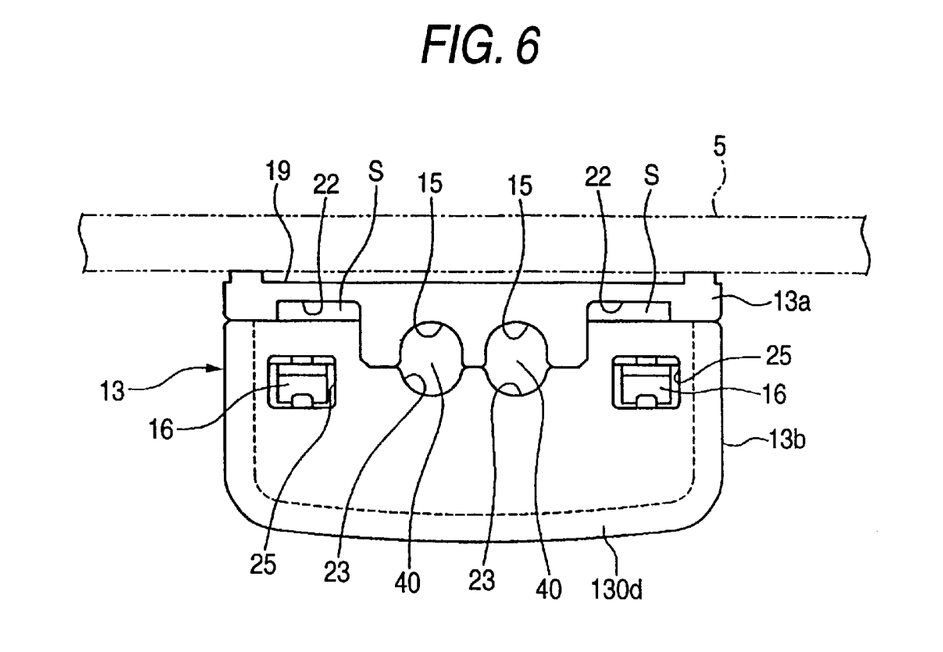
FIG. 6 is an enlarged view of a main part shown in FIG. 5.
Figure 7:
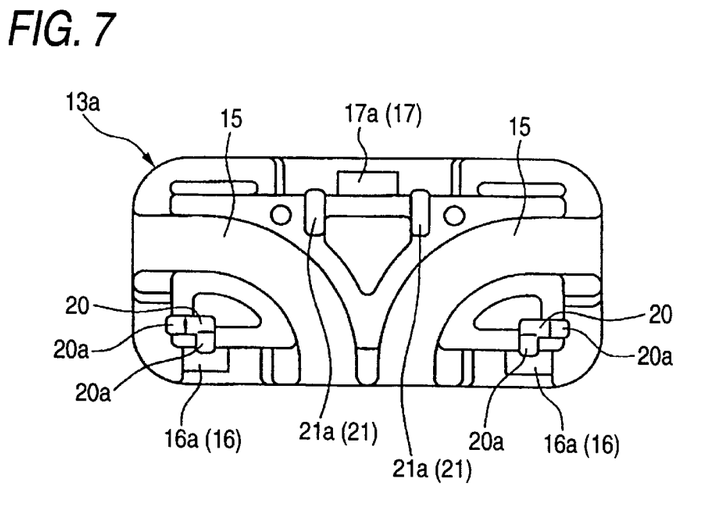
FIG. 7 is a plan view of a case main body according to the embodiment of the invention.
Figure 8:
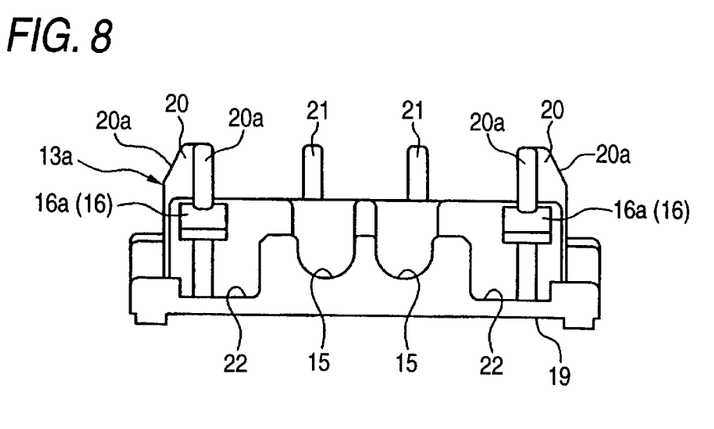
FIG. 8 is a front view of the case main body shown in FIG. 7.
Figure 9:
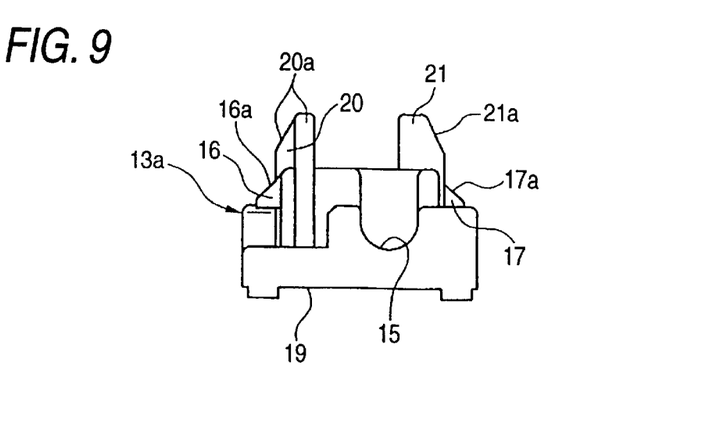
FIG. 9 is a side view of the case main body shown in FIG. 7.
Figure 10:
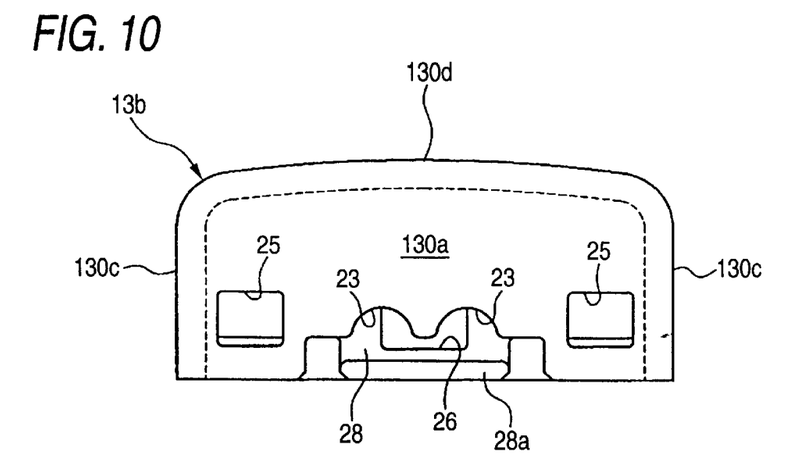
FIG. 10 is a front view of a lid according to the embodiment of the invention.
Figure 11:
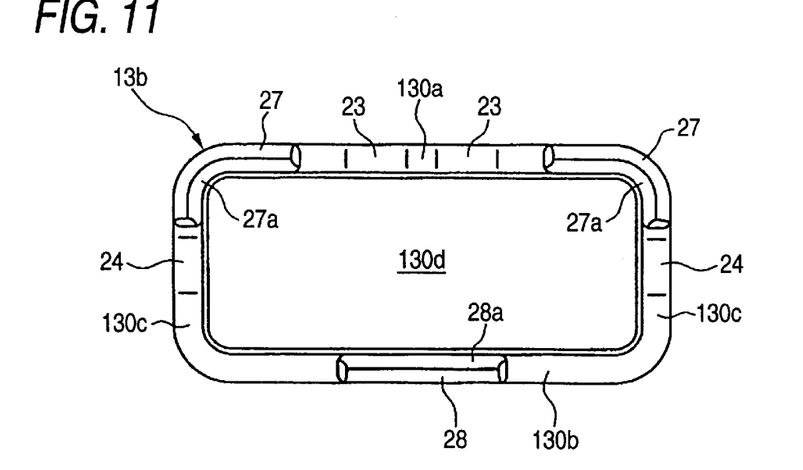
FIG. 11 is a plan view of the lid shown in FIG. 10.
Figure 12:
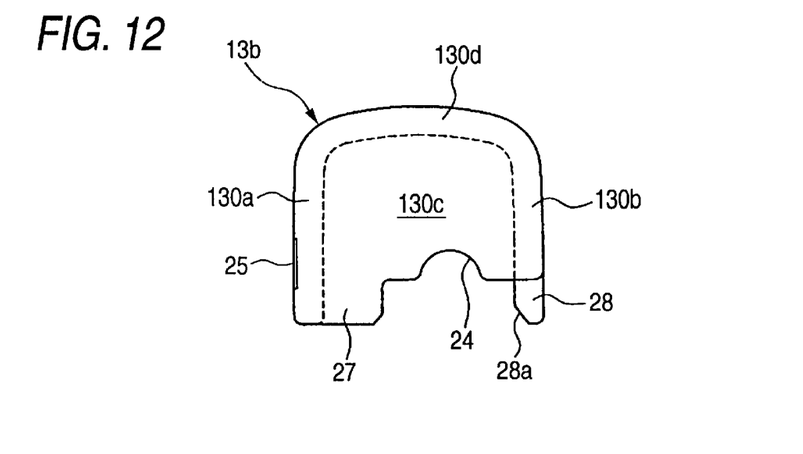
FIG. 12 is a side view of the lid shown in FIG. 10.

The harness protection case 13 comprises a case main body 13a shown in FIGS. 7 to 9 and a lid 13b shown in FIGS. 10 to 12 and is constructed to bundle the two harnesses 9 together as shown in FIG. 6 when both the case main body 13a and the lid 13b are assembled together.

As shown in FIG. 7, grooves 15 each having a semi-circular cross section are formed in the case main body 13a in such a manner as to extend from respective short side portions to a long side portion of the case main body in an arc-like fashion. Pawls 16 are provided in corner portions situated closer to the long side portion and surrounded by the positions where the grooves 15 are disposed, and another pawl 17 is provided at a central position on the other long side portion. Namely, a total of three pawls 16, 16, 17 are provided in such a manner that the pawls 16 and the pawl 17 are disposed across the respective grooves 15 with the pawl 17 being commonly used as one of each pair.

As shown in FIG. 9, inclined faces 16a, 16a, 17a are provided on the pawls 16, 16, 17, respectively, so that the respective pawls are smoothly guided into holes formed in the lid 13b, which will be described later, to be locked therein when receiving the lid 13b which is pushed in from above.

In addition, as shown in FIGS. 8, 9, a recessed portion 19 for application of an adhesive is formed in a lower wall of the case main body 13a in such a manner as to leave a circumferential portion of the lower wall raised. Additionally, the recessed portion is constructed to receive a sufficient amount of adhesive. Consequently, the circumference of the recessed portion 19 or the circumference of the lower wall of the case main body 13a abuts with the surface of the rear glass 5.

A guide 20 having an L-shaped cross section is provided in the vicinity of the pawl 16, which is one of the pair of pawls, in such a manner as to erect therefrom, and two inclined guide portions 20a are formed at an upper portion of the guide 20, whereas two erect guides 21 are provided on the pawl 17, which is the other pawl of the pair of pawls, in such a manner as to intervene the pawl 17 therebetween. An inclined guide portion 21a is also formed on an upper portion of the guide 21.

Note that the inclined faces 16a, 16a, 17a of the respective pawls 16, 16, 17 and the inclined guide portions 20a, 21a of the guides 20, 21 are all formed inclined to be oriented to the outside, so that the lid 13b is centered and guided to a proper position when the lid 13b is mounted on the case main body 13a.

As shown in FIG. 8, recessed portions 22 are formed on the long side portion of the case main body 13a where the two grooves 15 are arranged side by side in such a manner as to be situated on both sides of the grooves 15. As shown in FIG. 6, the recessed portions 22 are constructed to constitute slits S between the case main body 13a and the lid 13b when the latter is mounted on the former, whereby the engagement between the lid 13b and the case main body 13a through the pawls 16, 17 is designed to be released by inserting a screw driver or the like into the slit S for removal of the lid 13b from the case main body 13a.

As shown in FIGS. 10, 11, the lid 13b of the harness protection case 13 is a box-like member comprising a front wall 130a, a rear wall 130b and side walls 130c which surround the circumference of the lid 13b and an upper wall 130d which covers an upper portion of the lid 13b and adapted to be mounted on the case main body 13a in such a manner as to cover it from above. As shown in FIG. 10, two notched portions 23 are formed at a lower edge of the front wall 130a of the lid 13b at positions corresponding to the grooves 15 in the case main body 13a for constituting together with the grooves 15a holding portion 40 for holding the harnesses 9. In addition, as shown in FIG. 12, a notched portion 24 is formed at a lower edge of each side wall 130c of the lid 13b at a position corresponding to the groove 15 in the case main body 13a for constituting together with the groove 15 the holding portion 40 for holding the harness 9. These notched portions 23, 24 are formed to have a semi-circular cross section which is similar to that of the groove 15 so that the notched portions, together with the grooves 15, can fixedly hold the harnesses 9 therebetween when the lid 13b is mounted.

Then, holes 25 are formed on sides of the notched portions 23 in the front wall 130a which are adapted to be brought into engagement with the pawls 16 on the case main body 13a, and a hole 26 is also formed in the rear wall 130b which is adapted to be brought into engagement with the pawl 17.

Here, guide members 27, 27, 28 are mounted on the lower edge of the lid 13b at positions corresponding to corner portions formed between the front wall 130a and the side walls 130c and a central portion of the rear wall 130b. These guide members 27, 27, 28 are provided with inclined faces 27a, 27a, 28a on interior faces thereof, respectively. These inclined faces are constructed to correspond to the inclined guide portions 20a, 20a, 21a of the guides 20, 20, 21 on the case main body 13a so as to receive the inclined guide portions 20a, 20a, 21a in a smooth fashion. The lid 13b can be fitted on the case main body 13a with a force of a smaller magnitude owing to the inclined guide portions 20a, 20a, 21a of the guides 20, 20, 21 and the inclined faces 27a, 27a, 28a of the guide members 27, 27, 28, thereby facilitating the implementation of the required operation.

The holding portion 40 for bundling the plurality of harnesses 9 together is constituted by the grooves in the case main body 13a and the notched portions 23, 24 in the lid 13b.

Consequently, when the harnesses 9 for the hot wires 8 are wired on the rear glass 5, the connectors 11 attached to the two harnesses 9 are connected to the respective terminals 12 while the harnesses 9 are set in the respective grooves 15 in the case main body 13a of the harness protection case 13.

Then, in this condition, when the lid 13b is placed over the case main body 13a from thereabove in such a manner as to cover it, the inclined faces 27a, 27a, 28a of the guide members 27, 27, 28 provided on the lid 13b are guided by the inclined guide portions 20a, 20a, 21a of the guides 20, 20, 21 on the case main body 13a, respectively, and are guided further by the inclined faces 16a, 16a, 17a of the pawls 16, 16, 17, whereby the holes 25, 25, 26 in the lid 13b are locked on the pawls 16, 16, 17 on the case main body 13a.

Thus, the harnesses 9 are securely held by the holding portion 40 constituted by the grooves 15 in the case main body 13a and the notched portions 23, 24 in the lid 13b. In addition, in a case where the lid 13b is removed from the harness protection case 13 to replace the harnesses 9, a tool such as a screw driver is inserted into the slit S formed between the case main body 13a and the lid 13b to release the engagement between the pawls 16, 17 and the holes 25, 26 so as to pry the lid 13b open, and the lid 13b is removed in this condition, whereby the replacement of the harnesses 9 can be implemented easily.

Consequently, since the two harnesses 9 can be easily bundled together by the harness protection case 13, the assembling properties can be improved. In addition, since the two harnesses 9 can be bundled into the single bundle, the quality in external appearance around the harnesses can be increased. Furthermore, since the harnesses 9 are bundled into the single bundle, the interference of the harnesses with peripheral members can be prevented which would otherwise occur, whereby damages to the harnesses 9 can be prevented which would occur during a long-term service through contact of the harnesses 9 which would suspend due to the lack of the harness protection case which bundles the harnesses together with other components on the body due to vibrations generated when the vehicle is running.

On the other hand, when the roof 1 left in the closed condition as indicated by the solid lines in FIG. 2 is converted into the open condition as indicated by the chain lines in the same figure, the rear glass 5 disposed at the rear of the roof 1 is placed on the rear tray 6 in such a manner that the passenger compartment-side interior side of the rear glass 5 faces downwardly. As this occurs, since the harness protection case 13 is constructed such that the overall height H thereof from the passenger compartment-side interior side of the rear glass 5 becomes larger than the overall height h of the connector 11, the harness protection case 13 abuts with the rear tray 6 to function as a spacer, thus the abutment of the connector 11 with the rear tray 6 being prevented, whereby a risk can be eliminated that the connector 11 is damaged due to impact that is exerted thereon when the roof is opened or while the vehicle is running with the roof opened and a conductive condition cannot be maintained.

In addition, since the rear glass 5 can be stowed as close to the rear tray 6 as possible, the stowing position of the entirety of the soft top 3 can be kept as low as possible by an such an extent that the stowing position of the rear glass 5 can be set as low as possible. Consequently, not only can the quality in external appearance be increased but also the vision to the rear can be ensured sufficiently.

Note that while the invention has been described as being applied to the harness protection case 13 for the hot wires, the invention is not limited thereto but may be applied to a harness protection case for a wiper or a high mounted stop lamp. In addition, while the invention has been described as the two harnesses 9 are bundled together, the invention can be applied to a case where more than two harnesses 9 are bundled together.

As has been described heretofore, according to the first aspect of the invention, when the rear glass is stowed, since the harness protection case whose overall height becomes higher than the connector comes to abut with the interior member in the body to thereby prevent the contact of the connector with the interior member in the body, there is provided an advantage that the connector is prevented from being damaged. In addition, the stowing position of the entirety of the soft top can be kept as low as possible to such an extent that the stowing position of the rear glass can be set as low as possible, and consequently, not only can the quality in external appearance be increased but also the vision to the rear can be secured sufficiently.

Furthermore, since the harness protection case bundles the harnesses together at the holding portion thereof, there is provided another advantage that the interference of the harnesses with the peripheral members can be prevented, whereby the damages to the harnesses can be prevented. Moreover, the assembling properties of the harnesses can be improved and the quality in external appearance around the harnesses can be increased.

What is claimed is:

1. A conductive wires protection case construction on a rear glass in a convertible top comprising:

a harness protection case disposed on a surface of the rear glass at a position adjacent to a connector, and having an overall height which is higher than the connector, the harness protection case including a holding portion for bundling up a plurality of harnesses.

2. The conductive wires protection case construction according to claim 1, wherein the harness protection case includes: a case main body attached to the surface of the rear glass and having a first groove;

and a lid fitted to the case main body and having a second groove, and wherein the first and second grooves cooperatively define the holding portion.

3. The conductive wires protection case construction according to claim 1, wherein the connector is connected to a terminal attached to the surface of the real glass, and wherein the convertible top is folded so that the surface of the rear glass to which the harness protection case is attached faces a rear tray of a vehicle.

* * * * *